United States Patent [19]
Baleras et al.

[11] Patent Number: 5,383,355
[45] Date of Patent: Jan. 24, 1995

[54] GAS TURBINE ENGINE INSPECTION SYSTEM

[75] Inventors: Jean-Marc R. Baleras, Gometz le Chatel; Hermano Grossi, Villeparisis; Didier G. Moreau, Fouju, all of France

[73] Assignee: Societe Nationale d'Etude et de Construction de Moteurs d'Aviation "Snecma", Paris, France

[21] Appl. No.: 56,889

[22] Filed: May 5, 1993

[30] Foreign Application Priority Data

May 6, 1992 [FR] France .................. 92 05558

[51] Int. Cl.⁶ .................. G01L 3/26; G01L 5/13; G01M 15/00
[52] U.S. Cl. .................. 73/117.3; 73/117.4
[58] Field of Search .................. 73/117.2, 117.3, 117.4, 73/112, 115, 182, 183, 180, 714, 147, 756; 374/143; 364/424.03, 424.04, 431.01, 431.02, 431.03, 431.04, 580; 340/439; 324/73.1

[56] References Cited

U.S. PATENT DOCUMENTS

| | | | |
|---|---|---|---|
| 3,474,669 | 10/1969 | Carter et al. | 73/180 |
| 3,699,811 | 10/1972 | Maiden et al. | 73/189 |
| 4,787,053 | 11/1988 | Moore | 73/117.4 |

FOREIGN PATENT DOCUMENTS 0298012  1/1989  European Pat. Off. .

OTHER PUBLICATIONS

Patent Abstracts of Japan, vol. 10, No. 326 (N-532)(2382), Nov. 6, 1986, JP-A-61 131 852, Jun. 19, 1986.

Primary Examiner—Herbert Goldstein
Assistant Examiner—William L. Oen
Attorney, Agent, or Firm—Oblon, Spivak, McClelland, Maier & Neustadt

[57] ABSTRACT

A system for the examination or inspection of a gas turbine engine in which a computer 3 controls a series of probes by way of devices for controlling movements in different directions. Thus, there is a centralized control of the measurements for allowing faster performance. The system is applicable to tests on gas turbine engines, particularly prior to mass production.

8 Claims, 4 Drawing Sheets

GAS TURBINE ENGINE INSPECTION SYSTEM

BACKGROUND OF THE INVENTION

1. Field of the Invention

The invention relates to a gas turbine engine examination or inspection system more particularly incorporating a plurality of probes used therein and which can be temperature or pressure probes.

2. Description of the Related Art

Measurements of the flow characteristics in gas turbine engines during testing of the latter prior to mass production are very numerous and require the presence of a relatively large number of probes, which must also be constantly displaced in the longitudinal, frontal or radial directions, or must be orientable in accordance with the flow direction in the case of dynamic pressure probes. In the design previously used by the Applicant, the operators had to regulate the positions of the probes by manually controlling the motors which moved them by means of transmission mechanisms, which took a relatively long time.

SUMMARY OF THE INVENTION

The system proposed here is characterized in that it comprises a control computer, which issues probe displacement instructions, converters for converting the instructions into motor starting pulses, as well as position sensors on the transmissions, which are connected to the computer by a conditioning means and which indicate the position of the probes. It is therefore easily and in centralized manner possible to control the entire inspection system.

In the frequent case where the probes comprise pressure transducers rotating about an axis and which are provided with three total pressure inlet ports, which are oriented perpendicular to the axis and in divergent directions, two of them being connected to two intakes of a differential pressure sector, it is advantageous to use a more complicated arrangement in which the differential pressure transducers are respectively connected to the motor for moving the pressure probes by processing units able to start up the motors as a function of output signals of differential pressure transducers. The computer must then be designed in order to establish control switching operations of the motors between the processing units and the converters. This gives the possibility of the automatic control of the alignment of the pressure sensors on the flow by placing the third orifice, which is normally located at mid angular distance with respect to the other and connected to a total pressure transducer, in front of the flow.

Another optional improvement consists of the motors being provided with displacement transducers connected to the computer in order to confirm the satisfactory operation of these motors.

BRIEF DESCRIPTION OF THE DRAWINGS

The invention is described in greater detail hereinafter relative to non-limitative embodiments and with reference to the attached drawings, wherein show.

DESCRIPTION OF THE PREFERRED EMBODIMENTS

Figure 1:
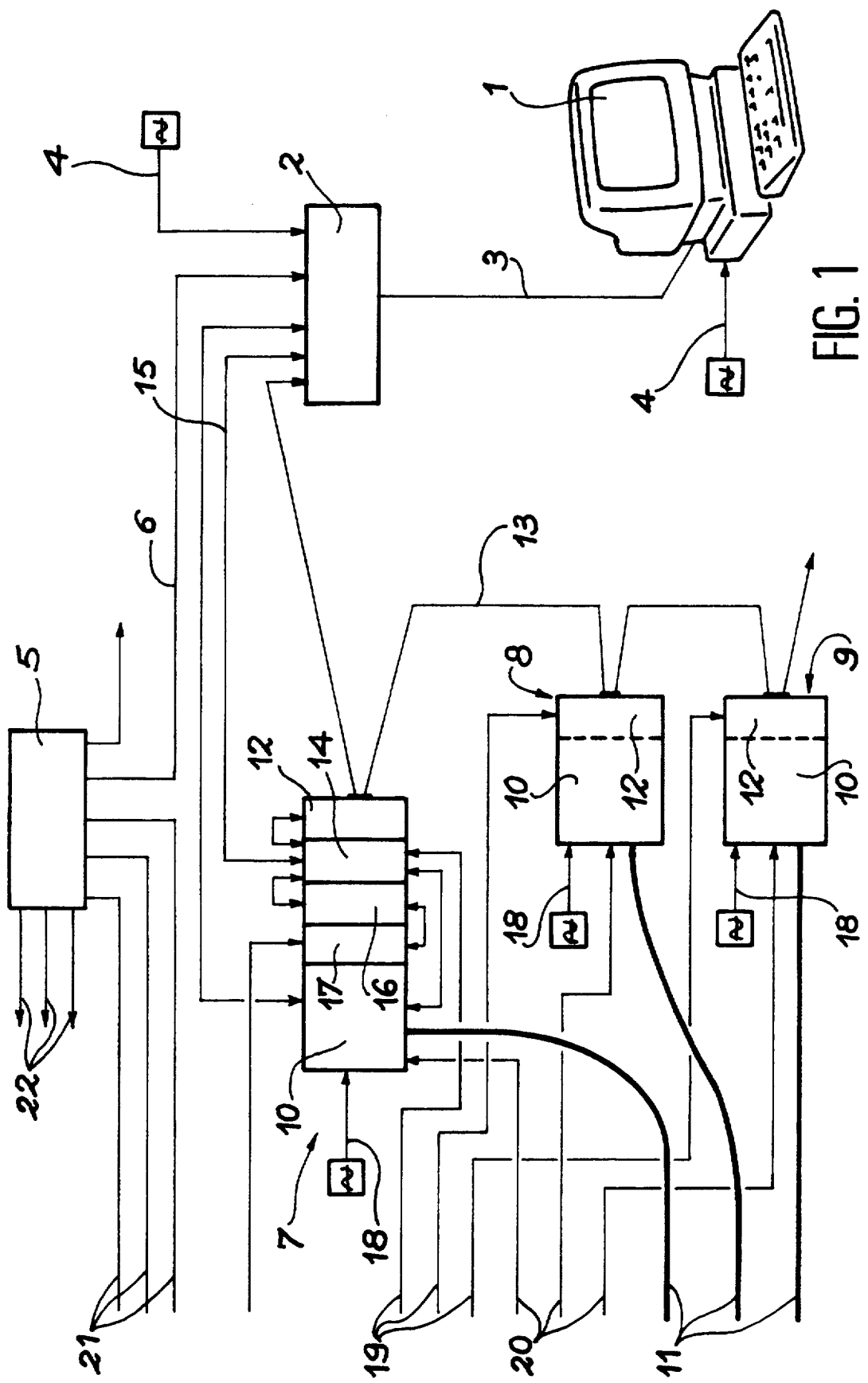
FIG. 1 A general view of the system.

The gas turbine engine examination or inspection system according to the invention is therefore a system for the servocontrol of the position of the probes, which can be generally provided with a very simplified manual control or an entirely automatic control in a particular case which will be described hereinafter. The probes are of standard design and are positioned at different points in a gas turbine engine. All the mechanisms and the means for controlling them can be identical, so that the following description will only relate to a single probe.

A computer 1 provided with an extension 2 connected thereto by a connecting cable 3 is allocated to the control of the following devices. It is provided with a keyboard and a screen by means of which the operator can supply instructions, which are then emitted. The extension 2 makes it possible to connect an adequate number of cables for all the probes. Two electric cables 4 respectively supply the computer 1 and extension 2 with electric power. A box or case 5 conditions the signals supplied by the sensors or transducers equipping the probes and, on request, supplies them to the computer 1 by means of a cable 6, which leads to the extension 2.

Each probe is controlled by servocontrol devices which will be described hereinafter. There are three of them 7, 8, 9 if the probe which they control must perform both pivoting and longitudinal radial movements. If not their number can be fewer. Each of them is provided with a power unit 10 connected to a stepping electric motor by a connecting cable 11. The electric motors controlling the probes will be described hereinafter. Each servocontrol device 7, 8, 9 also comprises an indexer 12 for controlling the corresponding power unit 10 and which is able to convert the instructions which it receives from the computer 1 on the displacements to be imposed on the probe in distance terms and with regards to the displacement direction and optionally speed into motor acceleration and deceleration gradients. The power unit 10 amplifies the signals received to an appropriate level and breaks them down on transforming them in order to control all the phases of the motor.

The indexers 12 are connected to the extension 2 by means of a cable 13 on which they are located in series. The indexers of the other probes, which are not shown, are also in series on the same cable 13. The computer 1 makes it possible to easily program the control instructions for distributing them to the indexers 12 in question.

The angular probe displacement servocontrol device 7 is more complicated and also has an inverter 14 connected by a cable 15 to the extension 2, an oscillator 16 and a differential pressure reading unit 17. The inverter 14 makes it possible to interrupt the control of the power unit 10 by the indexer 12 in order to substitute a control by the oscillator 16, which takes place in the same way with the aid of the output signal of the differential pressure reading unit 17 in accordance with a principle to be described hereinafter.

Reference numeral 18 designates the cables for supplying electricity to the servocontrol devices 7 to 9 and in particular the power units 10 and 19 designates the cables from the probe and which transmit to the indexers 12 (to the inverter 14 for the angular position servocontrol device 7) the probe end of travel information, while 20 designates the cables transmitting to the power units 10 the information that the rotations required of the motors have been correctly performed.

The power unit 10 is connected to the indexer 12 in a direct manner for the servocontrol devices 8, 9 and via the inverter 14 for the control device 7. As has been shown, it can also be connected to the oscillator 16 by the inverter 14.

The conditioning means 5 is supplied with output signals from the probes by the cables 21 and other cables 22 retransmit this information after it has been processed at an automatic measurement plotting system, which can be a printer, a curve tracer or any other such device.

Figure 2:
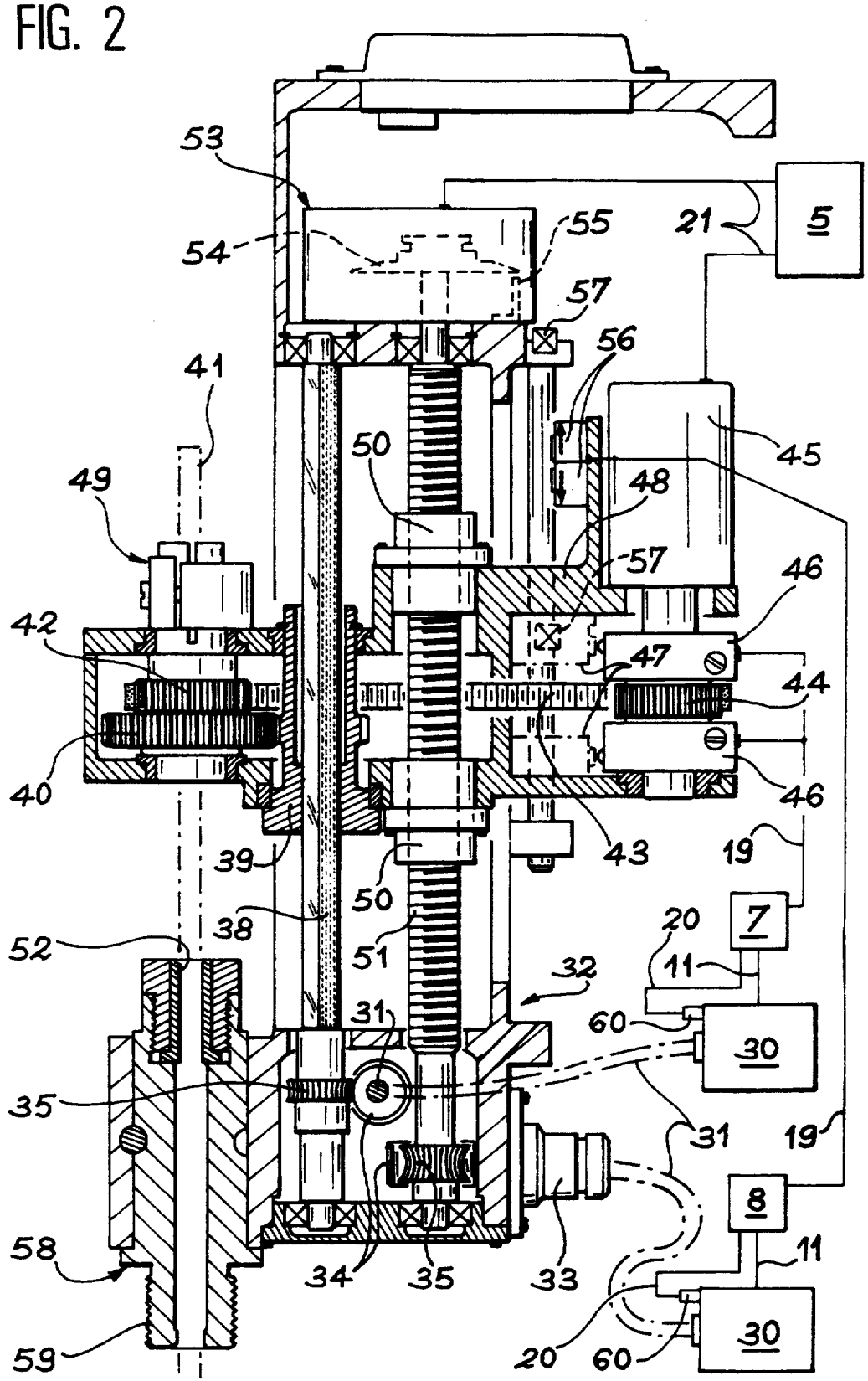
FIG. 2 A view of the probe holder mechanism.

The mechanism of FIG. 2 is intended to control a probe in angular displacement and in radial displacement. Two stepping motors 30 are connected to the servocontrol devices 7, 8 by connecting cables 11. The stepping motors 30 are also connected by flexible cables 31, able to transmit torques, to the control mechanism and enter a box 32 thereof by a respective end fitting 33, whereof only one is shown. Each of them rotates a worm screw 34, which forms a gear with a grooved pinion 35.

The pinion 35 associated with the angular position servocontrol device 7 is fixed to a square section shaft 38 on which is mounted a pinion 39, which transmits its rotation to a toothed wheel 40 connected to a probe holder rod 41 parallel to the shaft 38. Another toothed wheel 42 is connected by a belt 43 to a pinion 44 belonging to a resolver 45, whose function is to measure the angular displacements imposed on the probe holder rod 41. The shaft of the resolver 45 also carries on either side of the pinion 44 two rotary switches 46 which can in turn touch a respective striker pin 47 indicating the permitted end of travel. Both the switches 46 are connected to the cable 19. The resolver 45 is integral with a mobile carriage, as is the pinion 39, which is free to slide on the square section shaft 38, and the probe holder rod 41, whose end is fixed by a collar 49 integral with the carriage 48.

The carriage 48 carries two nuts 50 engaged in a screw shaft 51 on which the pinion 35 associated with the radial position servocontrol device 8 is fitted. The rotation of the screw shaft 51 which, like the square section shaft 38, is mounted on the box 32 bearings, displaces the carriage 48 vertically along its axis and leads to the sliding of the probe holder rod 41 in a journal bearing 52 integral with the box 32 and which supports the same. The journal bearing 52 belongs to a holding sleeve 58 terminated by a lower threaded portion 59.

The top of the screw shaft 51 enters an optical coder 53. It is provided there with a graduated disk 54 rotating in front of a reading point 55. There are two end of radial travel sensors 56 fixed to the carriage 48 and positioned in such a way as to in turn touch respective abutments 57 located at different heights on the box 32 and which are connected to the cable 19. The resolver 45 and the optical coder 53 are connected to the conditioning means 5 by the cables 21. Optical coders 60 are located in front of the shafts of the stepping motors 30. They are able to supply two phase-shifted square-wave signals, so as to indicate the values and rotation directions of the shafts to the power units 10 of the servocontrol devices 7, 8, 9 by cables 20. Thus, there is a check on the satisfactory operation of the stepping motors 30.

Figure 3:
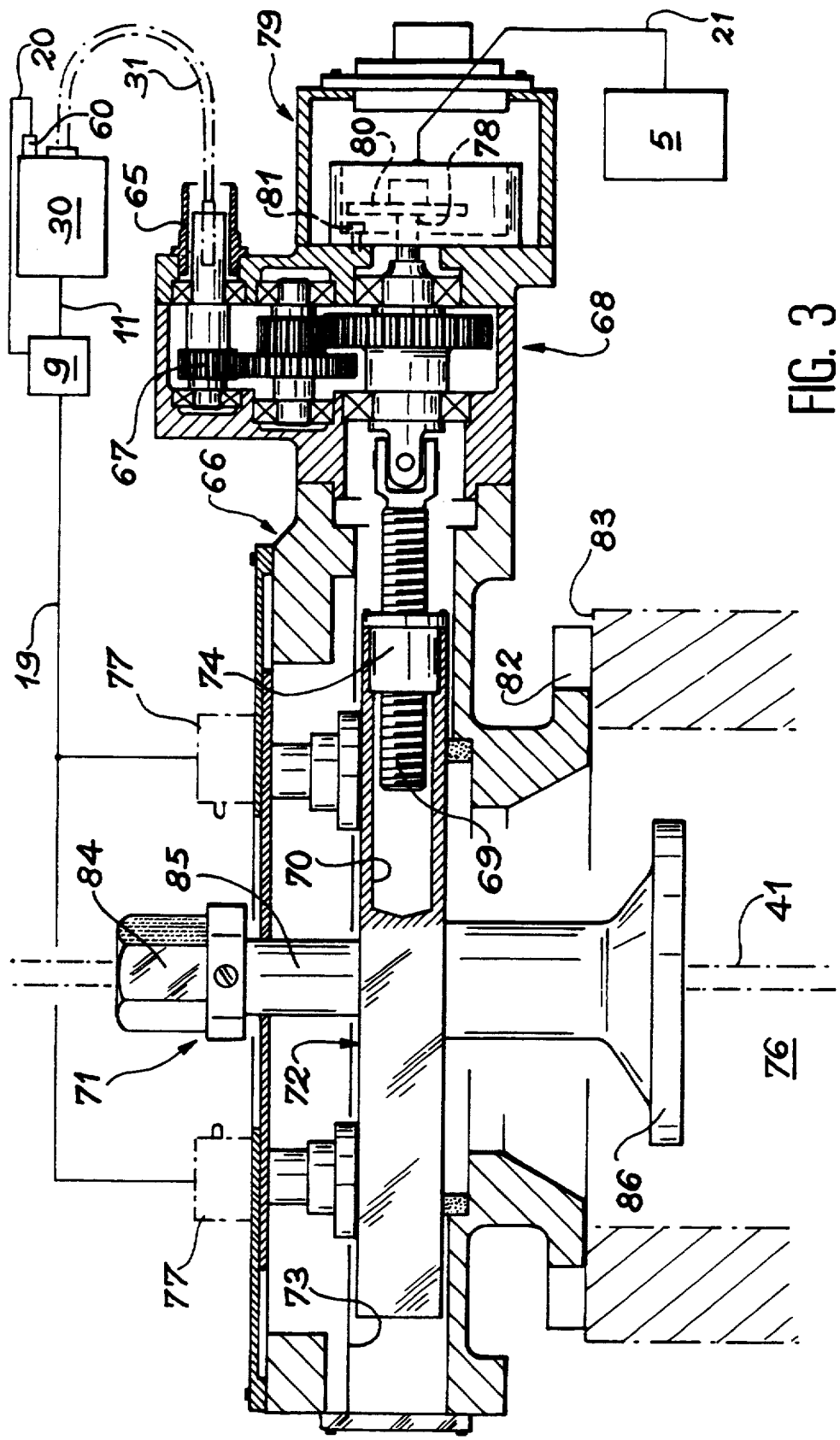
FIG. 3 A view of another probe holder mechanism.

The frontal position control mechanism shown in FIG. 3 also comprises a stepping motor 30 connected to the corresponding servocontrol device 9 by one of the connecting cables 11 and it also comprises another flexible cable 31, which enters an end fitting 65 identical to the end fittings 33 and located in a box 66, which contains the actual control mechanism. The flexible cable 31 is terminated by a pinion 67 at the end of a gear train 68, which rotates a screw 69. The screw 69 is engaged in a recess 70 of a probe guide 71, which is mobile in the box 66 and provided with a slide bar 72 in one end of which is made the recess 70. The screw 69, the recess 70 and the slide bar 72 are coaxial to a recess 73 having the same non-circular section as the slide bar 72 and which is made through the box 66. A screw bushing 74 is engaged on the end of the recess 70 and makes it possible to convert the rotation of the screw 69 into an axial displacement of the slide bar 72.

Apart from the slide bar 72, the probe guide 71 incorporates a sleeve 85, which widens downwards to form a flange 86. The sleeve 85 surrounds part of the probe holder rod 41 and partly penetrates an opening 76 of the envelope of a gas turbine engine in front of an area where measurements have to take place. The opening 76 has an adequate width to enable the probe holder rod 41 not to touch the walls thereof no matter what the displacements of the guide 71, whose displacements are also limited by two switches 77 located on the box 66 and which the sleeve 85 touches in turn. These switches 77 are engaged around the box 66 by clamps and can be locked at variable positions.

The toothed wheel of the gear train 68 responsible for the rotation of the screw 69 also brings about the rotation of a rod 78 coaxial to the screw 69 and located on its other side. The rod 78 belongs to an optical coder 79 and in the same way as the aforementioned optical coder carries a graduated disk 80 passing in front of a reading point 81.

Figure 4:
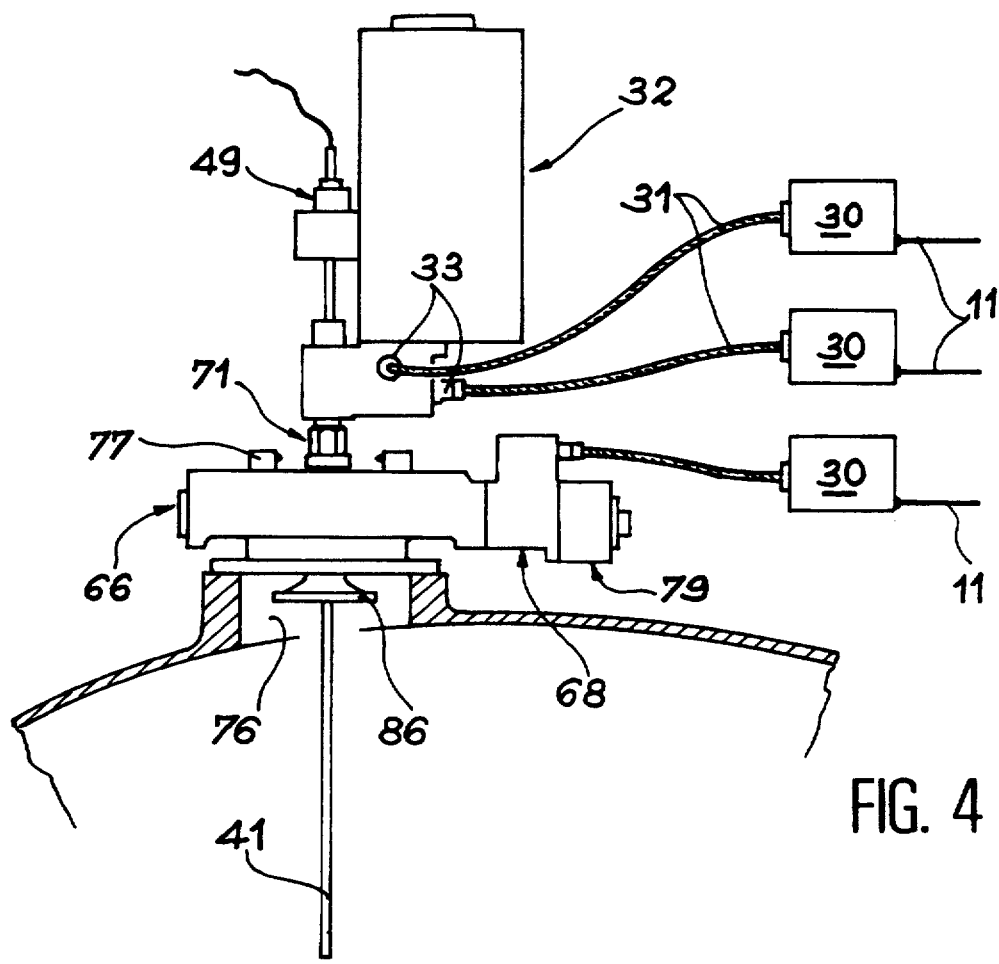
FIG. 4 A general view of two probe holder mechanisms mounted on a gas turbine engine section.

The box 66 comprises a flange 82 which surrounds the sleeve 85 and which is used for screwing the box 66 onto a bearing ring 83 of the gas turbine engine envelope around the opening 76. The sleeve 85 is terminated at its upper end by a nut 84 in which can be screwed the lower threaded portion 59 of the holding sleeve 58. It is thus possible to combine the two probe guiding devices without impeding the movements of the probe holder rod 41. FIG. 4 shows the arrangement obtained, as well as the complete probe. The flange 86 would be used for fixing the device to the gas turbine engine without modifying it in any way if only radial and angular displacements of the probe were required. The opening through the gas turbine engine envelope would then have a smaller diameter so as to permit fixing.

Figure 5:
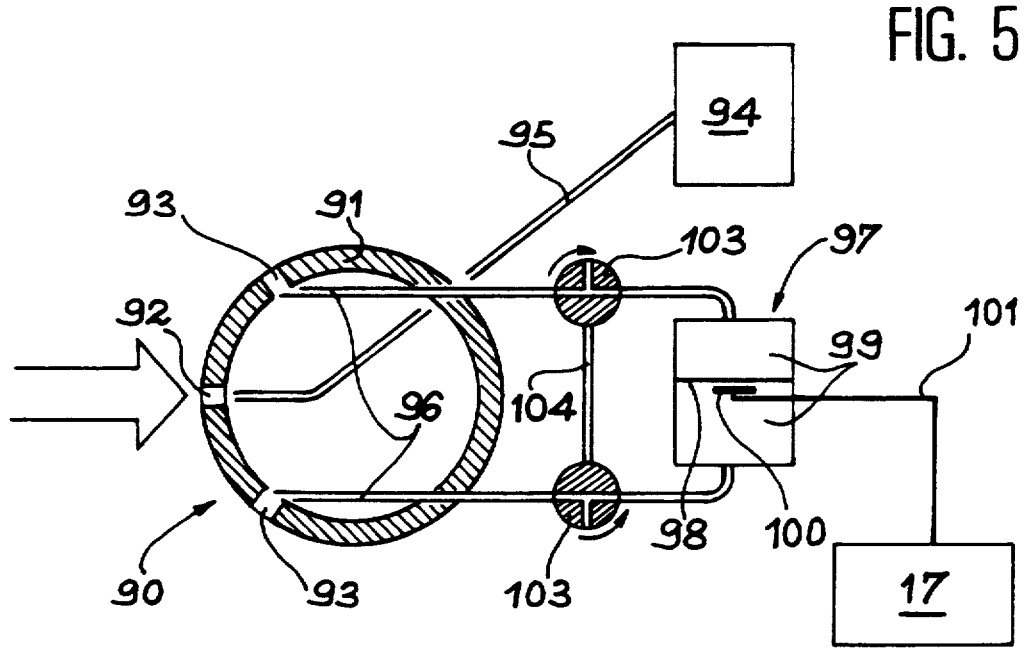
FIG. 5 A pressure probe and the parts linked therewith.

Reference should now be made to FIG. 5, where an improved pressure probe 90 is shown. It comprises a tube 91 constituting the end of the probe holder rod 41 engaged in the gas turbine engine and having a central orifice 92 and two lateral orifices 93 positioned symmetrically with respect to the previous one on a same section of the tube 91, the three orifices 92, 93 being located in directions passing through the tube 91.

The central orifice 92 is connected to a total pressure transducer 94 by means of a duct 95 and two ducts 96 respectively connect the lateral orifices 93 to a differential pressure transducer 97, which can essentially be constituted by a membrane 98 defining two chambers 99 into each of which issues one of the ducts 96. Strain gauges 100 bonded to the membrane 98 are connected by electrical wires 101 to the differential pressure reading unit 17, which has in particular a device such as a Wheatstone bridge for deducing the elongation of the strain gauges 100. Such a probe is conventionally used for making it possible to measure the total pressure of a flow, no matter what its direction. The tube 91 is rotated until the lateral orifices 93 are positioned symmetrically with respect to the flow, represented by the wide arrow. Then, apart from the static pressure, they are subject to the same fraction of the dynamic pressure of the flow, so that the differential pressure transducer 97 supplies a zero signal. It is then certain that the central orifice 92 is positioned in front of the flow and that the pressure measured by the transducer 94 is indeed the total pressure of the fluid at this point.

However, it should be noted that as a function of the static pressure a non-zero signal can appear in this state (due to the asymmetry of the chambers of the transducer, its thermal drift, etc.). This is why it is important to periodically calibrate the differential pressure transducer 97, which takes place in a position close to equilibrium (O$\Delta$P). Movement takes place of two valves 103, each located on one of the ducts 96, which they normally keep open, so that the two chambers 99 communicate with one another by the portion of the ducts 96 on this side of the valves 103 and by a connecting duct 104 between the valves 103. The pressures are then evened out in the chambers 99 and the remaining signal represents the quantity by which it is necessary to correct the measurements for the static pressure in question.

It is then possible to automatically control the correct alignment of the probe by placing the central orifice 92 in front of the flow direction. The oscillator module 16 is then used for controlling the electric motor 30 in question.

The system can operate either under the control of an operator, who controls the displacements of the probes, or automatically by following the instructions of a programme, which makes the probes perform series of measurements at predefined positions. However, even in the first case, the manipulation of the probes is much faster and less constrictive than in the known system, where the probes were not connected to any central control device. Thus, all the probes, twelve in the system constructed, can be manipulated at the same time. In addition, the probes are put into place more accurately and faster.

The control mechanisms can advantageously be cooled by air supplies leading to the boxes 32, 66 and by means of which cooling air is blown in. This air passes out of the openings of the boxes 32, 66. The fundamental advantage of the flexible cables 31 is to remove the electric motors 30 from the hot area. In addition, this leads to a gain as regards weight and the dimensions of the mechanisms. It also makes it possible to more easily manually control the probes, because it is merely necessary to disconnect them and introduce a key having the same section into the relevant end fittings 33 and 65.

We claim:

1. A system for inspecting a gas turbine engine, the system comprising:
   a plurality of probes for measuring engine characteristics of the engine at various locations of the engine, the probes being mounted on openings on the gas turbine engine through which a gas flows;
   displacement mechanisms operationally connected to said probes for displacing the probes;
   drive motors connected to said displacement mechanisms through transmission mechanisms for driving said displacement mechanisms;
   a control computer for emitting probe displacement instructions;
   converters for converting said displacement instructions into starting pulses for said drive motors; and
   position transducers on said displacement mechanisms, said position transducers being connected to said control computer by a conditioning means for indicating a position of said probes.

2. A system for inspecting a gas turbine engine according to claim 1, wherein the probes are temperature or pressure probes.

3. A system for inspecting a gas turbine engine according to claim 2, wherein the probes incorporate pressure probes rotating about an axis and provided with three total pressure inlet ports the inlet ports being perpendicular to the axis and oriented in divergent directions, a first inlet port and a second inlet port of said three inlet ports being connected to two intakes of at least one differential pressure transducer and a third inlet port of said three inlet ports, located at mid angular distance of the first and second inlet ports, being connected to a total pressure transducer.

4. A system for inspecting a gas turbine engine according to claim 3, further comprising a plurality of said differential pressure transducers which are respectively connected to the drive motors connected to the displacement mechanisms for the displacement of the pressure probes by processing units which are able to start up the drive motors as a function of output signals of the differential pressure transducers, the computer being designed to effect a motor control switching between the processing units and the converters.

5. A system for inspecting a gas turbine engine according to claim 3, wherein, for each differential pressure transducer, two ducts connect said differential pressure transducer to the first and second inlet ports of the three pressure inlet ports, the ducts being provided with valves, which are arranged so as to make it possible to close them, while then permitting a communication between the first and second inlet ports.

6. A system for inspecting a gas turbine engine according to claim 1, wherein the transmission mechanisms comprise flexible torque transmission cables.

7. A system for inspecting a gas turbine engine according to claim 1, wherein the drive motors are provided with displacement transducers connected to the computer.

8. A system for inspecting a gas turbine engine according to claim 1, wherein said displacement mechanisms comprise means for radially, laterally and pivotally displacing said probes.

* * * * *